United States Patent Office.

JAMES R. LITTLE, OF GALESBURG, ILLINOIS.

Letters Patent No. 108,037, dated October 4, 1870.

IMPROVEMENT IN CULTIVATORS.

The Schedule referred to in these Letters Patent and making part of the same.

I, JAMES R. LITTLE, of Galesburg, in the county of Knox and State of Illinois, have invented certain Improvements in Cultivators, of which the following is a specification.

Nature and Objects of the Invention.

The nature of my invention relates to improvements in attaching the shanks to the beams of cultivator-plows; and The invention consists in securing the shanks to the beams by means of an eye-bolt and socket, said socket being formed in two parts, one part of which is secured to the beam and the other part moves with the shank, all as hereinafter fully described; the object being in the double socket to provide facilities for adjusting the pitch of the shank, and thereby the pitch of the shovel attached to the same.

Description of the Accompanying Drawing.

Figure 1 is a top view of my invention.
Figure 2 is a side elevation.
Figure 3 is partly a top plan of fig. 2, and partly a sectional view on the plane of the line $x\ x$.

General Description.

Letter A represents the beam of an ordinary cultivator-plow, constructed in the usual manner.

B is the shank, which is cylindrical in form, and is shown broken away at the lower end in the drawing.

C is an eye-bolt, and D is a nut on the shank of the same, with a washer, E, between the nut D and the beam A.

G is a metal plate, hollow, as shown at fig. 3, and provided with tongues $g\ g$, which pierce and extend into the side of the beam A, for the purpose of preventing the plate G from sliding on the beam A.

The outer end, or most distant end of the plate G from the beam A, is cylindrical in form, as shown plainly at fig. 1, and is rabbeted annularly, as shown at fig. 3.

H is a cylindrical cap, the interior circumference of which corresponds with the exterior circumference of the rabbeted part of plate G, and fits neatly thereon, as shown at $h$, fig. 3.

The outer end of the plate or socket H is pierced for the passage of the shank and part of the eye of the eye-bolt C, as shown at figs. 1 and 3, and the outer face of said plate H is grooved to fit and receive the side of the cylindrical shank B, as shown at figs. 1 and 3.

I is a brace, with an eye, J, encircling the shank B, and pierced at the upper end with a series of holes, $i\ i\ i$.

K is a bolt, passing through one of the holes $i\ i\ i$, and through the beam A.

The operation and advantages of my invention are as follows:

The plate G is placed in position, with the plate H on its outer end, as shown in the drawing. The eye-bolt C is next made to encircle the shank B, and its own shank passed through the plates H and G, and the beam A. Now the washer E and nut D may be put in place, and the whole tightened up firmly and securely by means of the nut D.

By loosening the nut D, the shank B may be easily turned in the ordinary manner, for the purpose of throwing the dirt to the right or left, or adjusting the angle of the shovel to the line of progression of the machine.

But the principal advantage in my invention is in adjusting the pitch of the shank B when the bolt K is used in the different holes $i\ i\ i$. In this adjustment it will be seen that the plate H revolves on the end of the plate G, at the point $h$, thus allowing or keeping the shank B always in a line with the groove on the face of the plate H, which is the great trouble where the shank is moved on the grooved plate in this adjustment, and this defect has heretofore rendered the eye-bolt attachment useless for this very important adjustment.

The two plates G and H constitute a socket, with the advantage described over the single socket.

Claim.

I claim as my invention—

Securing the standards B to the beams A by means of the eye-bolt C and adjustable double socket G H, substantially as described and for the purpose set forth.

JAMES R. LITTLE.

Witnesses:
J. J. TUNNICLIFF,
PLATT R. RICHARDS.